(12) United States Patent
Hobson (10) Patent No.: US 8,181,042 B2
(45) Date of Patent: May 15, 2012

(54) LOW POWER MODE DATA PRESERVATION IN SECURE ICS

(75) Inventor: Russell Hobson, Glasgow (GB)

(73) Assignee: Atmel Corporation, San Jose, CA (US)

( * ) Notice: Subject to any disclaimer, the term of this patent is extended or adjusted under 35 U.S.C. 154(b) by 1052 days.

(21) Appl. No.: 11/706,094

(22) Filed: Feb. 12, 2007

(65) Prior Publication Data

US 2008/0195875 A1 Aug. 14, 2008

(51) Int. Cl.
*G06F 1/00* (2006.01)
(52) U.S. Cl. ....................................... 713/300
(58) Field of Classification Search .................... 713/300
See application file for complete search history.

(56) References Cited

U.S. PATENT DOCUMENTS

| | | | |
|---|---|---|---|
| 6,854,657 B2 | 2/2005 | Johnson | |
| 7,100,013 B1 * | 8/2006 | de Waal | 711/170 |
| 7,272,734 B2 * | 9/2007 | Gooding | 713/320 |
| 7,325,178 B2 * | 1/2008 | Damodaran et al. | 714/718 |
| 7,454,639 B2 * | 11/2008 | Jain et al. | 713/324 |
| 7,493,467 B2 * | 2/2009 | Gould | 711/211 |
| 2002/0114184 A1 | 8/2002 | Gongwer et al. | |
| 2004/0143769 A1 * | 7/2004 | Deng et al. | 713/300 |
| 2005/0122791 A1 | 6/2005 | Hajeck | |
| 2006/0047493 A1 * | 3/2006 | Gooding | 703/18 |
| 2006/0174148 A1 | 8/2006 | Yang | |
| 2006/0271678 A1 | 11/2006 | Jessup et al. | |
| 2007/0005998 A1 * | 1/2007 | Jain et al. | 713/300 |
| 2008/0005516 A1 * | 1/2008 | Meinschein et al. | 711/165 |
| 2008/0209248 A1 * | 8/2008 | Priel et al. | 713/340 |

OTHER PUBLICATIONS

ATMEL Corporation, the International Search Report and the Written Opinion of the corresponding PCT Application No. PCT/US2008/053755 dated Jun. 24, 2008, 10 pages.
ATMEL Corporation, the International Preliminary Report on Patentability of the corresponding PCT Application No. PCT/US2008/053755 dated Aug. 19, 2009, 6 pages.

* cited by examiner

*Primary Examiner* — Mohammed Rehman
(74) *Attorney, Agent, or Firm* — Fish & Richardson P.C.

(57) ABSTRACT

Methods, apparatus and computer program products are provided for reducing power consumption in a device. One method includes identifying a plurality of addressable areas for storing data in a volatile memory element of a device and, responsive to a detection of a power condition in the device, enabling power to a first portion of the addressable areas and disabling power to a second portion.

23 Claims, 6 Drawing Sheets

LOW POWER MODE DATA PRESERVATION IN SECURE ICS

TECHNICAL FIELD

The present invention is directed to power management in integrated circuits.

BACKGROUND

An integrated circuit (IC) consumes power as a function of operation and design considerations. Leakage current reflects the amount power that is consumed by a device in its various modes that is not attributable to device operation. As conventional processing technologies have allowed circuit dimensions to decrease, leakage current can represent a significant portion of the power consumption of a powered device.

One method for reducing leakage current is to remove power from inactive parts of an IC while preserving power to parts of the IC that must remain active depending on the mode of operation or to preserve data. For example, in a device that includes a central processing unit (CPU) and one or more memory blocks (e.g., integrated in a single IC or distributed over plural ICs), if the CPU is inactive and not executing code (e.g., in a sleep mode), one or more memory blocks associated with the device can be powered down to minimize power consumption. If the memory blocks are of the form of non-volatile memory, such as read only memory (ROMs or EEPROMs) their contents will be preserved. If the memory blocks are of the form of volatile memory, such as random access memory (RAM), their memory contents will not be preserved if power is removed. In some applications, it may be desirable to preserve memory contents and in particular preserve memory contents of volatile memory (RAM) during various operational modes of a given device (e.g., during low power mode). Conventionally, the entire volatile memory can be powered or only specific addressable portions of the memory block can be powered, thereby maintaining their contents.

Storage devices may be employed in various secure applications to store protected data. For example, a semiconductor memory circuit may be used in a smart card, set-top box, Subscriber Identity Module (SIM) card or banking card to store user identification information, account information, device preference information or electronic payment authorization information.

Because of the potential value of protected data stored in a storage device, hackers may employ various invasive and noninvasive techniques to access or corrupt the protected data. For example, a hacker may grind off a portion of the storage device packaging in order to access internal signals and bypass security measures that may be in place. As another example, a hacker may subject the storage device to various kinds of radiation (e.g., laser light directed to exposed internal circuits or x-ray or gamma radiation directed through packaging) in an attempt to corrupt protected data. In some devices, corruption of protected data at certain locations in the device may cause the device to bypass security measures (e.g., encryption algorithms) or to yield information to the hacker regarding device architecture or the protected data itself.

A hacker may also employ non-invasive, or "side channel" attacks to discover functional details of a storage device. In particular, a hacker may observe various aspects of the device in operation, and apply statistical analysis to the observed aspects to deduce operational details of the device or to extract sensitive information (e.g., encryption or decryption keys). For example, the hacker may use differential power analysis (DPA) to analyze power consumption during device operations. Since the power consumption may be directly related to particular operations, the hacker may be able to deduce, for example, particular bits of a key used in a decryption algorithm, by observing many instances of a particular operation and applying statistical analysis to the observations. Similarly, a hacker may employ electromagnetic analysis (EMA) to monitor radiation output of a device during particular operations; statistical analysis of the radiation may also reveal sensitive information. A hacker may also analyze timing between variations in power consumption or electromagnetic radiation to identify times at which key operations of known algorithms (e.g., encryption or decryption algorithms) are performed.

Once a hacker has extracted sensitive information from a device, the hacker may use the sensitive information for various nefarious purposes. For example, the hacker may obtain pay-per-view or video-on-demand services using another user's account; the hacker may access telecommunication services that are billed to another user; the hacker may steal another user's bank account funds; the hacker may steal another's identity; etc.

SUMMARY OF THE INVENTION

In one implementation a smartcard is provided that includes a volatile memory and a controller. The volatile memory includes plurality of addressable areas for storing data. The controller, responsive to a lower power condition, is operable to enable power to a first portion of the addressable areas and disable power to a second portion.

Aspects of the invention can include none, one or more of the following features. The addressable areas can include a plurality of memory banks. The smartcard can include a detector for detecting the lower power condition. The controller can dynamically determine which memory banks to power, and re-locate as necessary data that is required to be maintained during the lower power condition in powered banks of the volatile memory. Dynamically determining can include defining different portions for power at different points in time. Dynamically determining can be controlled in software. Software can move data in response to a determination of which portion is powered. Dynamically determining can include randomly determining the first and second portions. The controller can include an address scrambler operable to scramble addresses so that logical address associated with the memory map to different physical addresses in the memory.

In another aspect, a method is provided that includes identifying a plurality of addressable areas for storing data in a volatile memory element of a device and, responsive to a detection of a power condition in the device, enabling power to a first portion of the addressable areas and disabling power to a second portion.

In another aspect a circuit is provided that includes a volatile memory including plurality of addressable areas for storing data and a controller. The controller is responsive to a lower power condition for enabling power to a first portion of the addressable areas and disabling power to a second portion.

DETAILED DESCRIPTION OF ILLUSTRATIVE EXAMPLES

Figure 1:
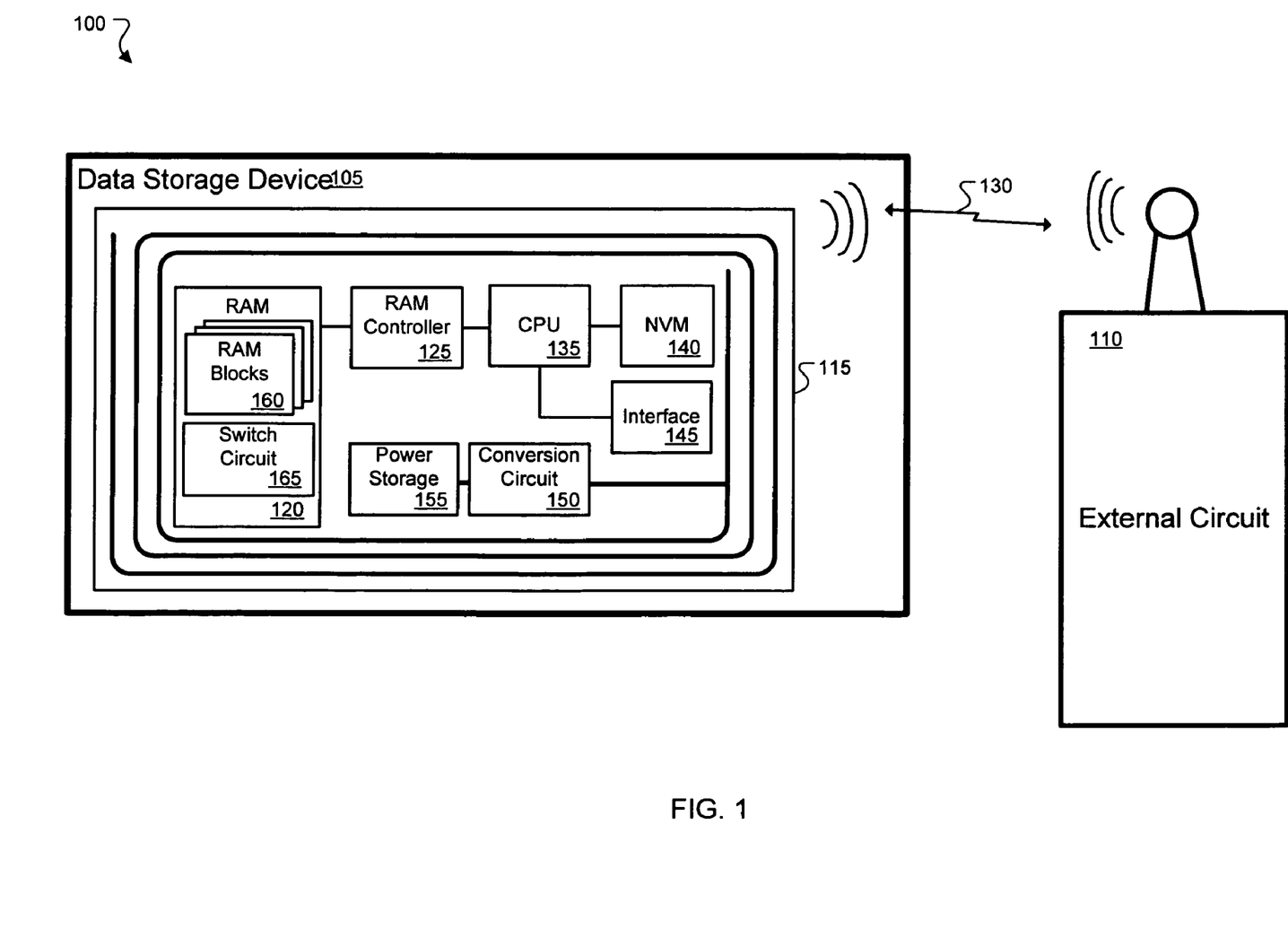
FIG. 1 is a schematic diagram illustrating an example of a smart card architecture.

FIG. 1 shows an example system 100 that includes a data storage device 105 (e.g., a stored value card) and an external circuit 110 (e.g., a reader). The data storage device 105 includes a controller (e.g., RAM controller 125) that can control the addressable portions of volatile memory that are included in the data storage device and that are to be powered in various operational modes of the device, so as, for example, to reduce power and to minimize the usefulness of leaked information. The data storage device 105 is generally configured to store data provided by an external circuit (e.g., in response to a write command) or provide data in response to an authorized request by the external circuit (e.g., in response to a read command). Because the data stored in or retrieved from the data storage device 105 may be protected data used in a sensitive application (e.g., an application involving user identification information, financial or other account information, or payment authorization information), a hacker may attempt to access the protected data. As described in more detail below, the RAM controller 125 along with other features discussed herein can thwart some attempts by hackers to access the data.

In some implementations, data is stored in the data storage device 105 in volatile memory (e.g., RAM 120) in a memory cell array that includes a number of blocks 160 (e.g., where a block can represent a logical partition of the memory into portions such as of the form of a page), where each block is arranged as a matrix of data locations or "cells," and each data cell stores a unit of data having, for example, a fixed size (e.g., one byte, one word, etc.). Individual data cells or portions of cells within a block can be addressable by a row address and a column address. The memory blocks 160 shown in FIG. 1 are merely exemplary; an actual memory device may have more or less blocks, rows or columns; or an actual memory device may have an alternative architecture (e.g., a non-paged architecture).

To store data in the data storage device 105 or to retrieve data from the data storage device 105, an external circuit (e.g., external circuit 110) supplies an address and one or more control signals specifying whether data is to be stored in or retrieved from the data storage device 105, or whether some other action is to be performed (e.g., memory is to be "refreshed" or erased or configured). Certain combinations of signals can be defined as "commands" to initiate particular operations (e.g., a read command, write command, refresh command, etc.). In some implementations, the external circuit 110 interfaces with the data storage device 105 through a control interface, an address interface and a data interface (not shown). The external circuit can supply appropriate signals to the control interface to specify, for example, a write command or a read command; the external circuit can supply an address to the address interface; and, in the case of a write operation, the external circuit can supply data to be written at the data interface. The data storage device 105 can employ additional circuits to store or retrieve data in response to signals provided by the external circuit to the control interface, address interface and data interface.

In one implementation, the data storage device 105 includes a smart card Integrated circuit (IC) 115 to process data and provide other functions (e.g., storing, retrieving or updating values (e.g. cash values), or other protected information) for the data storage device 105. In some implementations, the smart card IC 115 may operate in various power modes (e.g., a low or lower power mode) to reduce power consumption. For example, the smart card IC 115 may reduce power consumption by switching off some inactive dynamic switching components. To reduce leakage current due to the reduction of operating dynamic switching components, the smart card IC 115 may reduce a number of active components in the various power modes. In some implementations, the smart card IC 115 may disable a portion of a volatile memory of the data storage device 105 in a lower power mode to reduce leakage current while keeping a portion of the volatile memory active to preserve sensitive data. By way of example, reference will be made below to a low power mode of operation. Other power modes are possible, including a lower power mode where the power consumption of a given power mode is reduced as described herein.

In the depicted example, the smart card IC 115 includes a random access memory (RAM) 120 (e.g., SRAM or DRAM) and a RAM controller 125. Using the RAM controller 125, the smart card IC 115 can identify and select a portion of the RAM 120 to be active during an operational mode (e.g., a low power mode). Accordingly, the smart card IC 115 can reduce power consumption and leakage current while preserving data in the active portion of the RAM 120. In some implementations, the RAM controller 125 can also improve data security of the data storage device 105. For example, the RAM controller 125 can dynamically select the active portion of the RAM 120 in the low power mode to avoid exposing addressing information of the RAM 120.

As shown in FIG. 1, the data storage device 105 can communicate wirelessly with the external circuit 110 (e.g., the reader) via a communication channel 130. For example, the channel 130 can receive RF (radio frequency) signals at a specific frequency and/or using a particular communication protocol. In some implementations, the protocol can be characterized by ISO/IEC 14443 or ISO 15693 (ISO refers to the International Organization for Standardization; IEC refers to the International Electrotechnical Commission). Other protocols can be used.

In some examples, the data storage device 105 may also communicate with the external circuit 110 (e.g., the reader) using a wired or wireless (or a combination of the two) communication channel that is adapted for a particular communication protocol. Some exemplary protocols may be characterized by standards such as, ISO/IEC 7816 or ISO/IEC 7810.

Through the communication channel 130, the external circuit 110 can transmit data to and/or receive data from the smart card IC 115. In one application, a user can store data representing a monetary value in the data storage device 105 using the external device. In another application, a user can initiate a monetary transaction (e.g., purchasing services or goods) to update the stored monetary value using the external device.

In the implementation shown, the smart card IC 115 includes a CPU 135 (e.g., a microprocessor or microcontroller), a non-volatile memory (NVM) 140 (e.g., read only memory (ROM), flash memory, etc.), and an interface 145 (e.g., communication interfaces adapted for the communication protocols). Other configurations and components are possible. The NVM 140 can store data, such as personal identification, the monetary value, and other information. The NVM 140 can also store instructions to be executed by the CPU 135. For example, the NVM 140 may include instructions to update the monetary value stored in the NVM 140 in response to a transaction complete message received from the external device. In some implementations, the CPU 135 may load instructions from the NVM 140 to the RAM 120 and execute instructions stored in the RAM 120.

In some implementations, the CPU 135 can also execute instructions received through the interface 145. For example, the external device may transmit a reset instruction to the CPU 135 via the interface 145 to reset the smart card IC 115. In another example, the external device may transmit, via the interface 145, an instruction to put the smart card IC 115 in the low power mode.

The smart card IC 115 also includes a conversion circuit 150 and a power storage device 155 (e.g., a battery or low-loss capacitor). In some implementations, the smart card IC 115 can receive power from an antenna using the conversion circuit 150. For example, the antenna can receive RF signals from the external circuit and convert energy in the RF signals to electrical energy to be stored in the power storage device 155. The power storage device 155 can supply power to various components of the smart card IC 115 for operation.

In some implementations, the power storage device 155 may include a power sensor that measures a power level remaining in the power storage device 155. For example, the power sensor may be a voltage sensor that measure the voltage output of the power storage device 155. In some implementations, the RAM controller 125 may use the power sensor to determine whether the device (and as is discussed below in particular the RAM 120) is to be operated in a low power mode. For example, if the power sensor determines that the voltage output of the power storage device is lower than a predetermined threshold, then the RAM controller 125 may determine that the RAM 120 is to be operating in the low power mode.

In the low (or lower) power mode, the smart card IC 115 may, for example, reduce the number of dynamic switching components to reduce power consumption. For example, when a low (lower) power mode trigger is detected (e.g., the power sensor detects a low power condition), the CPU 135 can execute one or more instructions for controlling portions of the storage device 105. In one implementation, the CPU 135 can execute instructions which operate to control which portions of RAM 120 are active. In some implementations, the smart card IC 115 may be configured to remove power from inactive components of the smart card IC 115 in a low power mode (e.g., the RAM controller 125 can be configured or instructed to determine which blocks to power, vary the blocks, move data or otherwise maintain a portion of the memory contents of RAM 120 in a powered configuration). Thereafter, the smart card IC 115 may remove power from the CPU 135 when the CPU 135 is not executing instructions. In some examples, removing power from the inactive components of the smart card IC 115 may reduce leakage current due to the reduced number of operating dynamic switching components in the smart card IC 115.

As discussed above, in some implementations, the smart card IC 115 may disable a portion of the RAM 120 in a low (lower) power mode. To preserve sensitive content or high priority data in the RAM 120 in a low (lower) power mode, the smart card IC 115 may continue to enable a portion of the RAM 120. The smart card IC 115 can then store the preserved data in the enabled portion of the RAM 120 during a low (lower) power mode. In some examples, the smart card IC 115 may preserve data that is used for exiting from the low (lower) power mode. In other examples, the smart card IC 115 may preserve sensitive data that is not desired to be lost due to loss of power.

In this example, the RAM 120 includes multiple RAM blocks 160a-160x (or RAM banks) and a switch circuit 165. In some implementations, the RAM 120 can be partitioned into the RAM blocks 160. For example, each of the RAM blocks 160 may represent an addressable memory area in the RAM 120. In one example, each of the RAM blocks 160 may represent a physical memory segment of the RAM 120. In another example, each of the RAM blocks 160 may represent a logical memory segment in the RAM 120. In various implementations, the RAM blocks 160 may or may not have identical sizes. For example, the RAM controller 125 can dynamically determine a size of an active RAM portion. The active RAM portion can include one or more of the RAM blocks 160. Based on a present condition (e.g., an amount of preserved data) and/or some predetermined parameters (e.g., a minimum block size, operating mode of the system 100, etc.), the RAM controller 125 can dynamically determine a size of the active portion of the RAM 120 in a low (lower) power mode. Some examples of dynamically selecting a size of the active portion are described with reference to FIG. 2.

The switch circuit 165 can control power supplied to the RAM blocks 160. For example, the switch circuit 165 may control power supplied to one or more of the RAM blocks 160 based on control signals received from the RAM controller 125. In some implementations, the smart card IC 115 may enable a portion of the RAM 120 using the switch circuit 165. For example, the RAM controller 125 can enable one or more of the RAM blocks 160 by controlling the switch circuit 165 to enable power supplied to the one or more of the RAM blocks 160. Similarly, the RAM controller 125 can disable a portion of the RAM 120 using the switch circuit 165.

In some implementations, the switch circuit 165 may control power supplied to each of the RAM blocks 160 independently. For example, the switch circuit 165 may include a plurality of voltage switches. Each of the voltage switches may connect one of the RAM blocks 160 to the power storage device 155. By controlling the switches in the switch circuit 165, each of the RAM blocks 160 can be individually enabled or disabled. In certain implementations, each of the RAM blocks 160 may include sub-blocks that are enabled separately by the switch circuit 165. Accordingly, greater flexibility may be obtained to control the RAM blocks 160 and sub-blocks. For example, the switch circuit 165 may be used to simultaneously enable a portion of one of the RAM blocks 160 while disabling a portion of the same RAM block 160.

In the depicted example, the switch circuit 165 is integrated as part of the RAM 120. In some implementations, the switch circuit 165 may be integrated in a voltage regulator that regulates power to the RAM blocks 160. In other implementations, the switch circuit 165 may be a separate module for controlling power supplied to the RAM blocks 160. For example, the switch circuit 165 may be an application specific integrated circuit (ASIC) implemented external to the RAM 120 that controls power supplied to the RAM blocks 160. In some implementations, the switch circuit 165 can be digital switches that control the operation of the RAM 120. For example, the switch circuit 165 can be chip enable circuits that generate enable or disable signals to each of the RAM blocks 160 based on the control signals received from the RAM controller 125.

In operation, the switch circuit 165 can be controlled by the RAM controller 125 to independently enable and/or disable portions of the RAM 120. For example, the RAM controller 125 can select a portion of the RAM 120 to be enabled by sending control signals to the switch circuit 165. In another example, the RAM controller 125 can also select a portion of the RAM 120 to be disabled by sending control signals to the switch circuit 165. In some implementations, the RAM controller 125 can dynamically select a portion of the RAM blocks 160 to be enabled based on one or more parameters, such as an amount of sensitive data in the RAM 120, an address mapping information, a previously selected portion of the RAM 120, and a power mode of the smart card IC 115. Using the switch circuit 165 to control which memory portion (s) are to be enabled, the RAM controller 125 can preserve higher priority data in the RAM 120 while reducing the leakage current in the RAM 120 during a low power mode.

In some implementations, the RAM controller 125 is configured to vary locations of the active and inactive portions of the RAM 120. For example, the RAM controller 125 can dynamically select the location of the active portion of the RAM 120 at each occurrence of a low (lower) power mode. By dynamically selecting the active portion of the RAM 120 at each occurrence, the RAM controller 125 can prevent the smart card IC 115 from exposing addressing information of the RAM 120. Various selection algorithms may be used to select the active memory portion during a low (lower) power mode. For example, the RAM controller 125 can use a round-robin algorithm to select the active RAM blocks 160. In another example, the RAM controller 125 may store multiple configurations that specify memory locations of the RAM 120 to be active. When the smart card IC 115 transitions into a low (lower) power mode, the RAM controller 125 may load one of the multiple configurations to identify the active portion in the RAM 120. In some implementations, the RAM controller 125 can include a scrambler 126 for generating one or more random or pseudo-random numbers that represent the RAM blocks 160. For example, the RAM controller 125 may randomly generate the numbers one and three, meaning that the first RAM block 160 and the third RAM block 160 are selected.

In some implementations, the RAM controller 125 may be operable (i.e., programmable) to relocate data at preset intervals or in response to a configuration (or re-configuration prompt) from an operating system associated with the smart card IC 115. In these implementations, if a power condition is detected (e.g., low power), the RAM controller 125 may initially relocate data in accordance with an initial selection (e.g., RAM controller 125 may select which blocks of the RAM which are to remain powered and which are un-powered). After a predetermined time period, data may once again be relocated to using an different selection if the power condition remains (e.g., RAM controller 125 may select a different portion of RAM to be powered/un-powered and move data accordingly). Alternatively, an operating system associated with the smart card IC 115 can trigger the relocation of data. Selecting and relocating of data can be performed in hardware, software of combinations of both.

Figure 2:
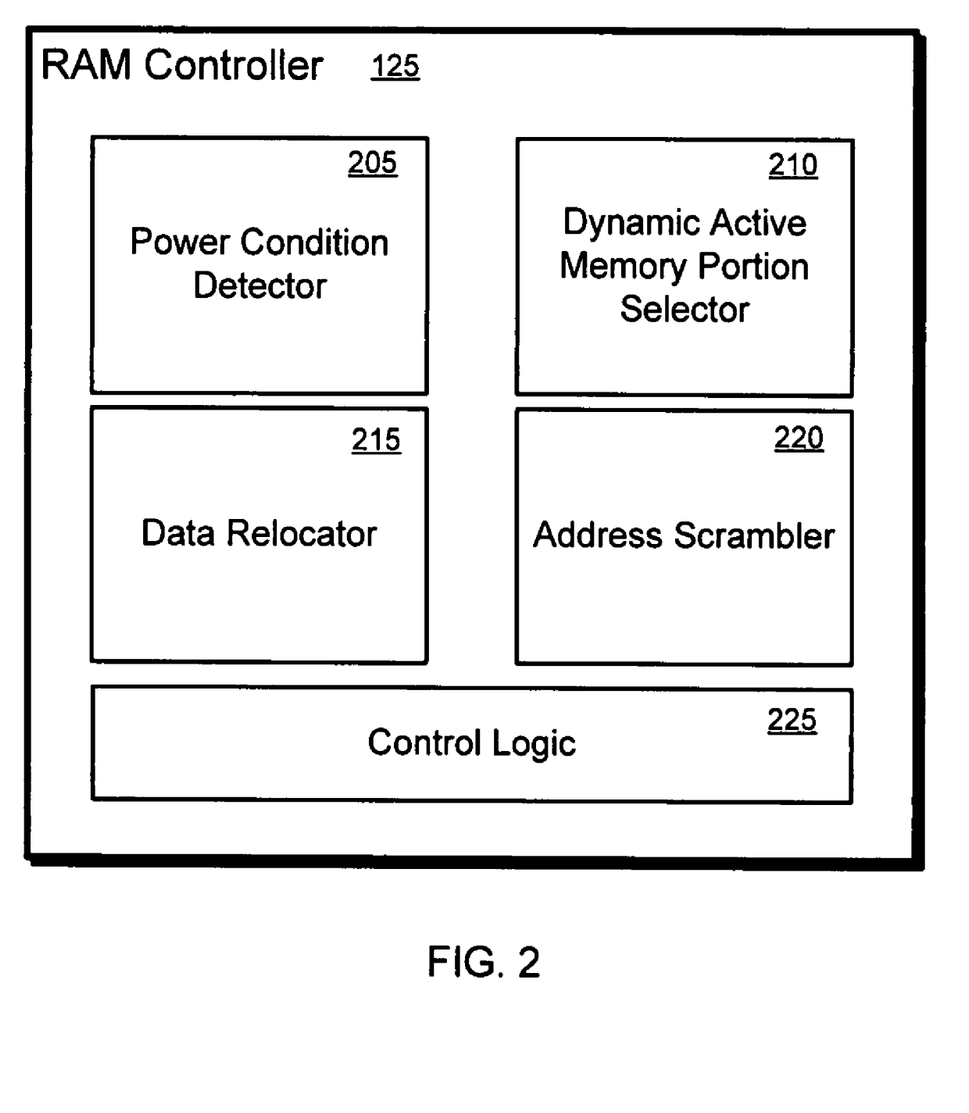
FIG. 2 is a block diagram illustrating an example of a random access memory controller.

FIG. 2 is a block diagram illustrating an example of the RAM controller 125. In other examples, the RAM controller 125 may include some or all components depicted in FIG. 2 to select the active portion/deselect the inactive portion of the memory in a low power mode. In some examples, some components in the depicted example may be external to the RAM controller 125. The RAM controller 125 can be used in the smart card IC 115 to enable and disable the RAM blocks 160 during, for example, a low power mode.

In the depicted example, the RAM controller 125 includes a power condition detector 205 and a dynamic active memory portion selector (DAMPS) 210. Using the power condition detector 205 and the DAMPS 210, the RAM controller 125 can select, in response to a detected low power condition, a portion of the memory to be enabled and a portion of the memory to be disabled.

In some implementations, the power condition detector 205 can detect a low power condition of the smart card IC 115 (FIG. 1) by, for example, measuring a voltage output of the power storage device 155 or detecting a low power mode in the smart card IC 115. For example, the power condition detector 205 may determine that the smart card IC 115 is in a low power condition if the voltage output of the power storage device 155 is lower than a predetermined threshold. In another example, the power condition detector 205 may receive signals from a power sensor in the power storage device 155 that indicate the power condition of the power storage device 155. In another example, the power condition detector 205 may also receives software messages notifying the RAM controller 125 of a change of operation mode to, for example, a low power mode. For example, when the CPU 135 is transitioning from the normal power mode to low power mode, the CPU 135 may transmit a control signal notifying the power condition detector 205 about the transition. In another example, the power condition detector 205 may detect the low power condition by measuring a distance between the data storage device 105 and the external circuit. For example, the power condition detector 205 may measure the distance using a RF signal sensor to detect a RF signal strength from the reader 110. Alternatively, the smart card IC 115 may respond to any hardware of software event that triggers a mode change (e.g., to change to a lower power mode when for example higher power demands are faced (e.g., when a co-processor is powered in the smart card IC 115)) or other trigger event (e.g., the completion of a subroutine, the detection of an interrupt, etc.).

After the power condition detector 205 determines that the smart card IC 115 is operating in a low power mode, the DAMPS 210 is configured to dynamically select a portion of the memory to be enabled while disabling other portion(s) of the memory. For example, the DAMPS 210 may select to enable a portion of the addressable memory areas in order to store the preserved data during the low power mode. In some implementations, the DAMPS 210 may include software to control the dynamic selection. For example, the DAMPS 210 may include software to define different portions of a memory to be enabled when a low power condition is detected.

In some implementations, the DAMPS 210 may access one or more predetermined active memory configurations. For example, the memory configuration may include addresses that specify a memory portion to be active in the low power mode. By selecting one of the predetermined configurations, the DAMPS 210 may identify the active portion of the memory using the addresses included in the configuration. Based on the identified memory portion, the RAM controller 125 may, for example, control the switch circuit 165 to continue powering the active memory portion of the memory.

In some implementations, the DAMPS 210 may select a different memory portion to be powered in the low power mode at different points in time. For example, the DAMPS 210 may randomly generate memory configurations using a random number generator. For example, the location of active memory blocks and inactive memory blocks may be selected randomly. In another example, the DAMPS 210 may include software to determine a present configuration of the active memory blocks based on one or more previous configurations.

In some implementations, the DAMPS 210 may also dynamically determine a size of the active memory portion. For example, the DAMPS 210 can determine a total amount of high priority data stored in the memory. Based on the determined amount, the DAMPS 210 may, for example, determine a portion of memory blocks to remain active when a low power mode is detected. In one implementation, the DAMPS 210 can select a size of the active memory portion directly related to the total amount of high priority data stored in the memory. In some examples, selecting a smaller portion of the RAM blocks 160 to be activated may further reduce leakage current in the memory. In some examples, the RAM controller 125 may compress the preserved data to reduce memory space required to store the preserved data. In some implementations, the RAM controller 125 may compress the preserved data using a compression ratio based on the transition time (e.g., transition time from a low power mode to other operating modes, or transition time from the other operating modes to a low power mode) requirements.

In this example, the RAM controller 125 includes a data relocator 215 to move data in response to the selection of the active memory portion and the inactive memory portion. In some implementations, the data relocator 215 may move data from the inactive memory portion to the active memory portion. For example, the data relocator can copy data stored in the inactive portion of the RAM blocks 160 (FIG. 1) to the active portion of the RAM blocks 160. In other examples, the data relocator 215 may move the data to the active portion of the memory.

The RAM controller 125 also includes an address scrambler 220 to scramble the logical addresses of the RAM blocks 160. For example, the address scrambler 220 can randomly generate mappings between logical addresses and physical memory locations. In certain implementations, the address scrambler 220 may map a physical memory block to a segment of logical memory addresses based on a present scrambler configuration.

Using the address scrambler 220, the RAM controller 125 may prevent extraction of addressing information of the memory. For example, suppose a fixed set of logical addresses is selected to remain active. By changing the scrambler configuration, the RAM controller 125 can change the physical memory portion selected to remain active. Because the address scrambler 220 can randomize a mapping between physical addresses and logical addresses, the RAM controller 125 can prevent the probing or observation of data. For example, as configured in some implementations described herein, the RAM controller 125 can prevent probing of data 1) in the memory itself as the physical location of stored data moves as the scrambling or logical address change, and 2) at the output of the memory (e.g., as data is moved between physical blocks, the wires which must be probed to read the data changes). Further, if address lines are being forced/probed and the logical/physical addresses are changing, then it is difficult to determine the address sequence required to extract data from powered portions of the memory.

The RAM controller 125 further includes a control logic 225. For example, the control logic 225 can be a microcontroller or a microprocessor of the RAM controller 125. In one example, the control logic 225 may execute software instructions that control the power condition detector 205, the DAMPS 210, the data relocator 215, and the address scrambler 220. In another example, the control logic 225 may be a software module that manages operations for the RAM controller 125.

In some examples, the RAM controller 125 may use the control logic 225 to execute operations to preserve data in an active portion of the memory. As an illustrative example, the RAM controller 125 can use the DAMPS 210 to dynamically select an active portion of the RAM blocks 160 after the power condition detector 205 detected a low power condition. After the active RAM portion is selected, the data relocator 215 can, based on the configuration of the address scrambler 220, identify physical locations of the active RAM portion and the inactive RAM portion. Using the identified physical locations, the data relocator 215 can move data as required (i.e., the data to be preserved) from any inactive RAM portion to the active RAM portion. After the preserved data is copied or moved to the active RAM portion, the RAM controller 125 may then disable the inactive RAM portion.

Although one configuration of the RAM controller 125 is described, other configurations of the RAM controller 125 may also preserve data in other modes (e.g. other low power or other device modes). In one implementation, the RAM controller 125 may preserve the data without using the address scrambler 220. For example, the data relocator 215 can identify the physical locations of the active memory portion directly. Using such configuration, the RAM controller 125 can reduce transition time from the normal power mode to the low power mode.

In another implementation, the address scrambler 220 can directly control the switching circuit 165 using the identified physical memory locations of the selected active memory portion. For example, the DAMPS 210 can specify logical locations (e.g., the logical addresses) of the selected active memory portion to the address scrambler 220. Using the specified locations, the address scrambler 220 can generate the corresponding physical addresses of the selected active memory portion. Then, the address scrambler 220 can generate control signals to the switch circuit 165 to enable power be supplied to the active memory portion and disable power to the inactive memory portion.

Figure 3:
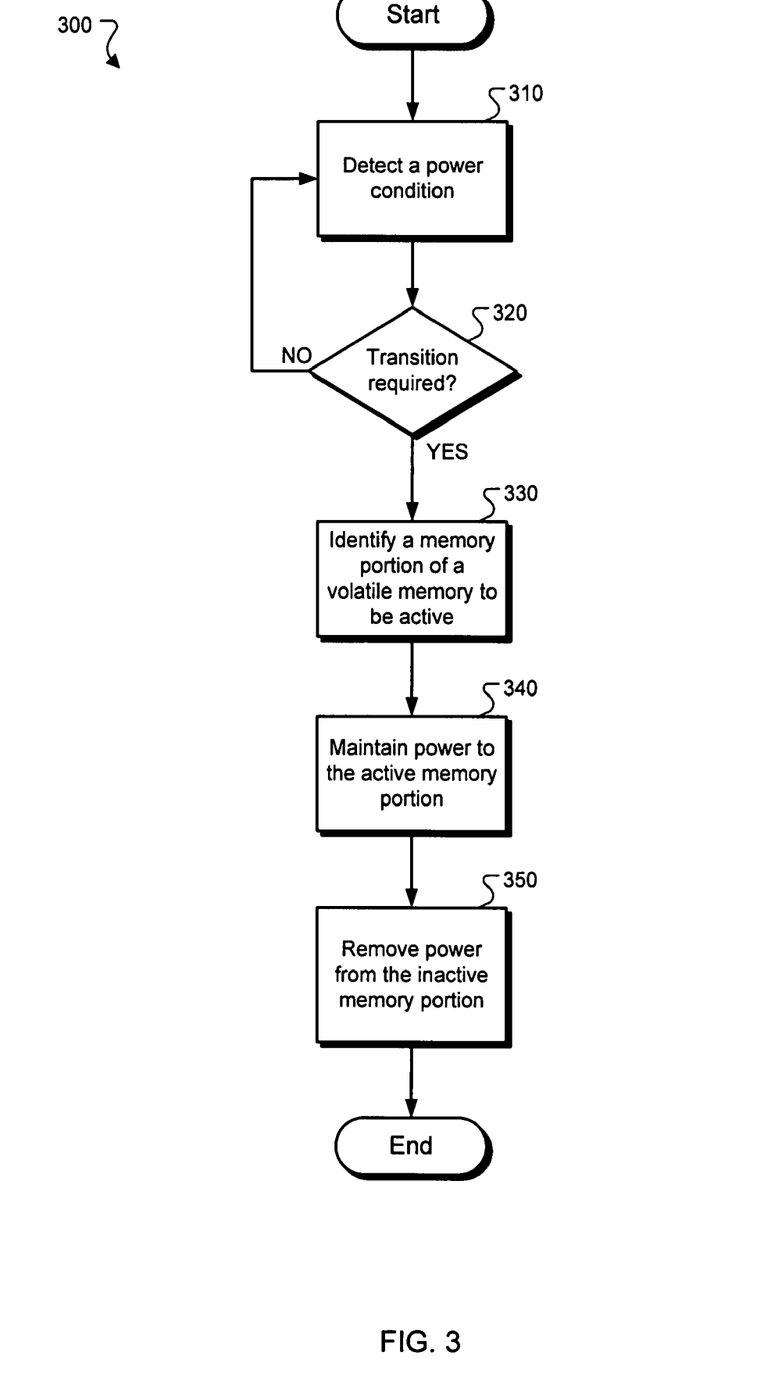
FIG. 3 is a flow diagram illustrating an example method for reducing leakage current in a memory device.

FIG. 3 is a flow diagram illustrating an example method 300 for reducing leakage current in device. For example, the RAM controller 125 (FIGS. 1-2) may use the method 300 to reduce leakage current and preserve high priority data in an operational mode for a device (e.g., the data storage device 105). The method 300 begins in step 310 with detecting a power condition. For example, the RAM controller 125 may use the power condition detector 205 to detect a power condition of the smart card IC 115. For example, the power condition detector 205 may measure a voltage level of the power storage device 155 to determine the power condition of the smart card IC 115. In another example, the power condition detector 205 may receive, from the CPU 135, a power condition notification message that may notify the RAM controller 125 about a transition to a low power condition.

After the power condition is detected, the power condition is evaluated in step 320. For example, using a detection result from the detector 205, the RAM controller 125 can use the control logic 225 to determine whether the power level is low. Depending on the result of the evaluation, then step 310 is repeated. For example, it may be determined that no power transition is required (e.g., the power level is above a threshold). If it is determined that a transition is required, then a memory portion of a volatile memory is, in step 330, identified to be active. For example, the RAM controller 125 can identify a portion of the RAM 120 to be active by loading a predetermined configuration that specifies which portion of the RAM 120 is to be active in the low power mode.

After the active memory portion is identified, power supplied to the active memory portion is maintained in step 340. In some implementations, the RAM controller 125 can control the switch circuit 165 to continuously enable the power supply of the active memory portion. In step 350, the power supplied to the inactive memory portion is removed and the method 300 ends. For example, the RAM controller 125 may disable the power supply of the inactive memory portion using the switch circuit 165.

Figure 4:
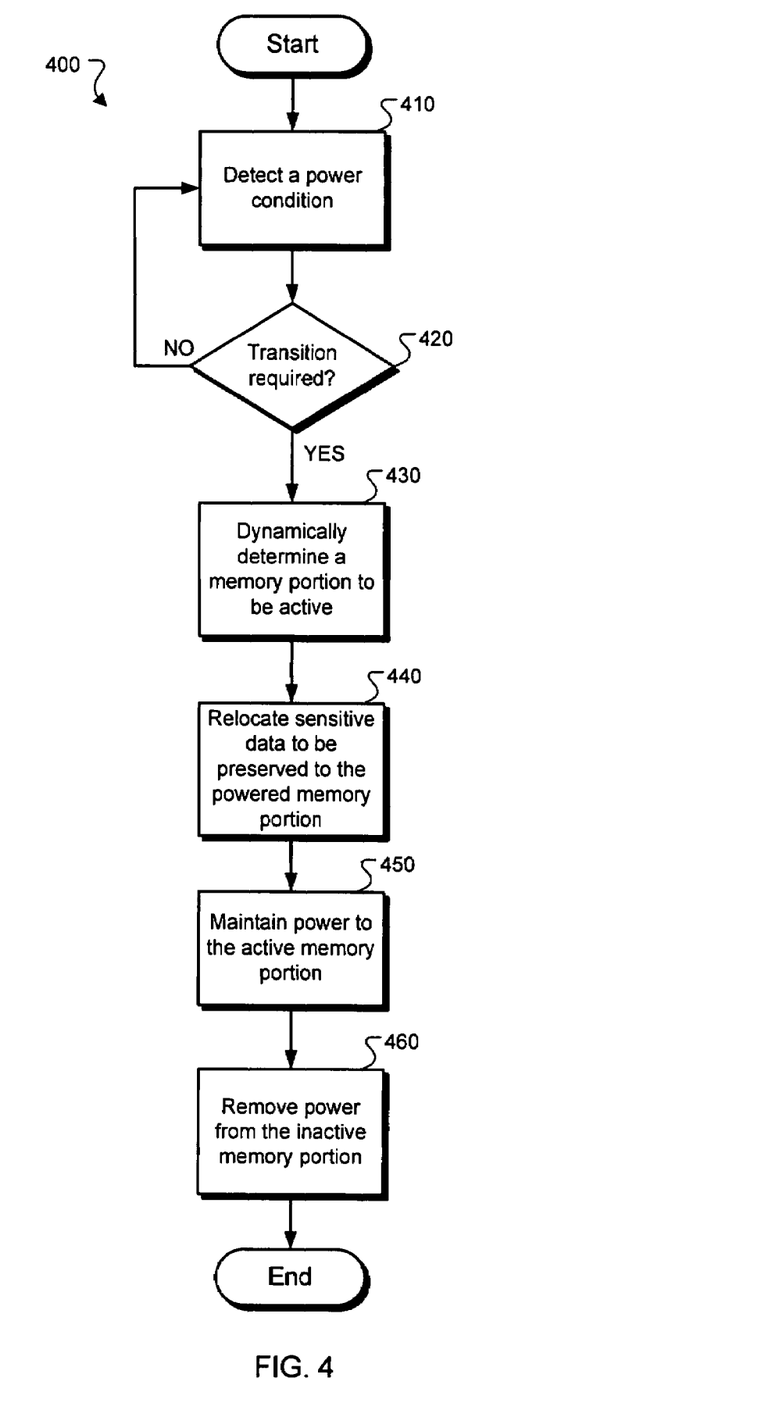
FIGS. 4-6 are flow diagrams illustrating exemplary methods for reducing leakage current and enhancing security in a memory device.
Figure 5:
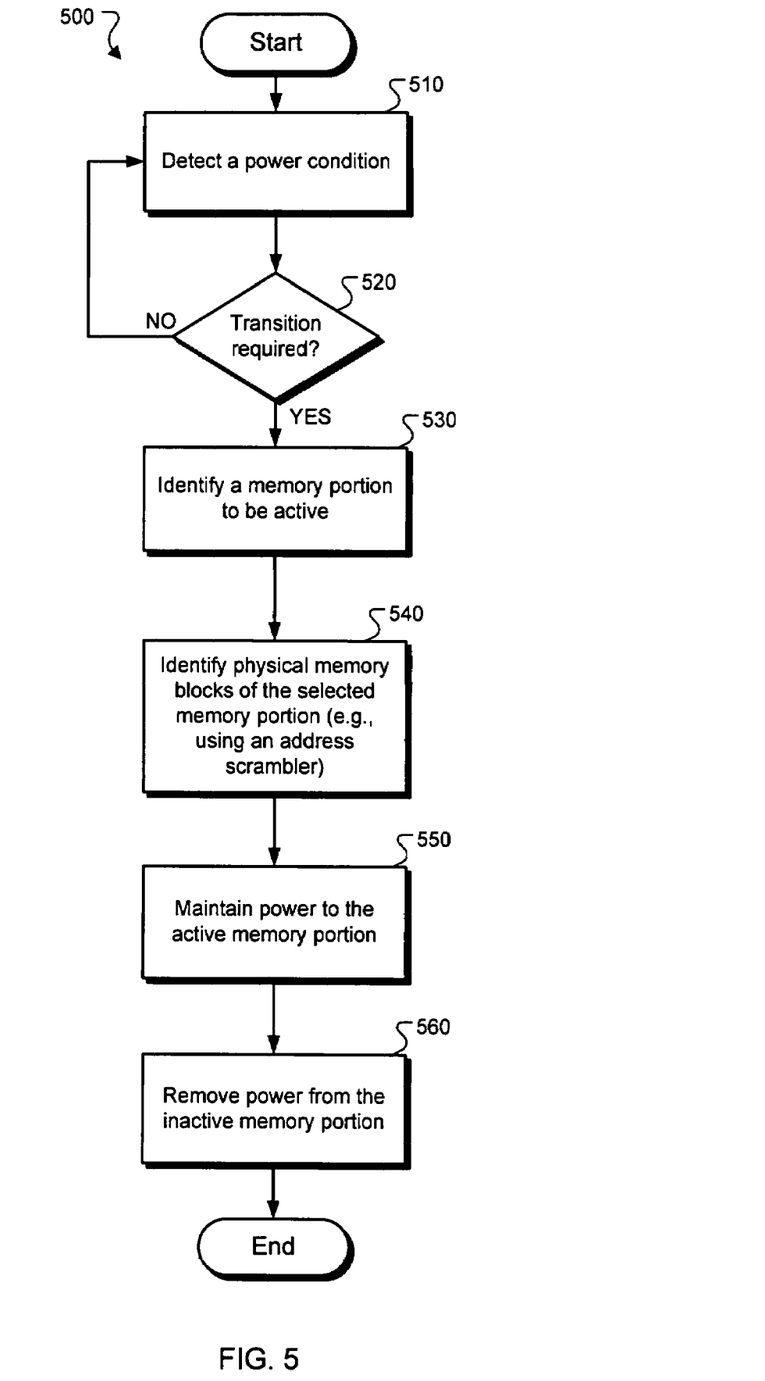
Figure 6:
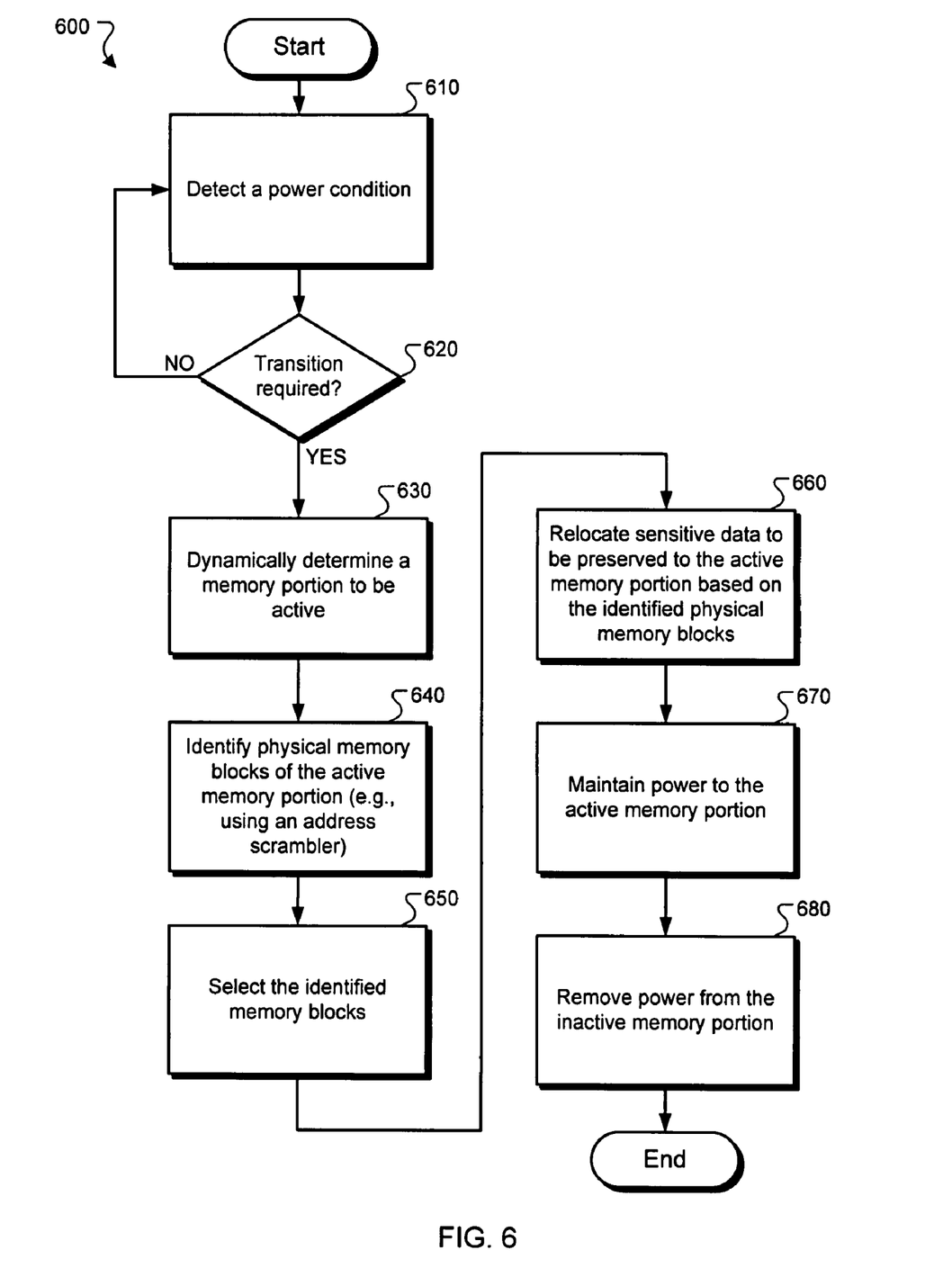

FIGS. 4-6 are flow diagrams illustrating example methods 400, 500, 600 for reducing leakage current and preserving high priority data while enhancing security in a memory device (e.g., the RAM 120 in FIG. 1). As shown in FIG. 4, the method 400 begins in step 410 with detecting a power condition. For example, the RAM controller 125 (FIGS. 1-2) may use the power condition detector 205 to detect a power condition of the smart card IC 115. Next, the power condition is evaluated, in step 420 (e.g., whether a power level is low). For example, the RAM controller 125 can use a detection result from the detector 205 to determine whether the power level is low. If it is determined that no power transition is required, then the step 410 is repeated. If it is determined that the power transition is required, then a memory portion is dynamically determined to be active (step 430). For example, the RAM controller 125 may use the DAMPS 210 to dynamically select the active memory portion using various selection methods (e.g., round robin, random selection, etc.).

In step 440, sensitive data to be preserved is identified and relocated as required to the powered memory portion. For example, the data relocator 215 can move the sensitive data to the active memory portion determined by the DAMPS 210. In some implementations, the data relocator 215 may identify destination addresses for moving the sensitive data based on the selected active memory portion. After the sensitive data is relocated, power to the active memory portion is maintained in step 450. For example, the RAM controller 125 may control the switch circuit 165 to continuously enable the selected active memory portion in the low power mode. In step 460, the power supplied to the inactive memory portion is removed and the method 400 ends. For example, the RAM controller 125 may disable the power supply to the selected inactive memory portion using the switch circuit 165.

As shown in FIG. 5, the method 500 begins in step 510 with detecting a power condition. Next, the power condition is evaluated, in step 520 (e.g., whether a power level is low). If it is determined that a transition is not required, then the step 510 is repeated. If it is determined that a transition is warranted, then a memory portion is identified, in step 530, to be active. For example, the RAM controller 125 may identify the active memory portion by generating one or more random numbers that represent memory blocks selected to be active.

In step 540, physical memory blocks of the selected memory portion are identified. For example, the RAM controller 125 can identify the physical memory blocks of the selected memory portion based on a present configuration of the address scrambler 220. Next, power to the active memory portion is maintained in step 550. In step 560, the power supplied to the inactive memory portion is removed and the method 500 ends. For example, the RAM controller 125 can maintain power to the selected active memory portion and remove power from the unselected memory portion in the low power mode.

As shown in FIG. 6, the method 600 begins in step 610 with detecting a power condition. Next, the power condition is evaluated, in step 620 (e.g., whether a power level is low). If it is determined that no transition is required, then the step 610 is repeated. If it is determined that a transition is warranted, then a memory portion is dynamically determined to be active in step 630. For example, the RAM controller 125 may use the DAMPS 210 to dynamically determine the active memory portion. In one implementation, the DAMPS 210 may first determine a size of the active portion-based on a size of the preserved data. Based on the determined size, the DAMPS 210 may dynamically generate logical addresses that represent memory areas to be active.

After the active memory portion is determined, physical memory blocks of the active memory portion are identified in step 640. For example, the RAM controller 125 (FIG. 1) may use the address scrambler 220 to identify the physical memory blocks of the active memory portion. In one implementation, the address scrambler 220 may generate a mapping between logical addresses of the memory and the physical memory locations.

In step 650, the identified memory blocks are selected. Next, sensitive data to be preserved is, in step 660, relocated as required to the active memory portion based on the identified physical memory blocks. For example, the data relocator 210 may move the sensitive data to the identified physical memory blocks. In step 670, power to the active memory portion is maintained. The power supplied to the inactive memory portion is, in step 680, removed and the method 600 ends. For example, the switch circuit 165 may disconnect the inactive memory portion and the power supply.

Although some exemplary methods 300, 400, 500, 600 are described, the RAM controller 125 may also use other methods to reduce leakage current in low power mode. For example, methods may also be supplemented or augmented by other processing and/or control elements that may be incorporated by an interface (e.g., the data bus 130 or other communication interfaces). In another example, some steps in each of the methods 300, 400, 500, 600 may be executed in different orders. In another example, steps in the methods 300, 400, 500, 600 may be combined, removed, and/or interchanged to enhance data security and/or improve system performance (e.g., time for transitioning between the normal power mode and the low power mode). Further, the methods described may be implemented in other modes of operation, other than those associated with low power. For example, the methods may be used to extend the operating life of a device even though the current operating parameters are not below a threshold level.

In some implementations, the RAM controller 125 may be used in other embedded ICs, such as in a microcontroller IC. For example, the microcontroller may include a volatile memory. In a low power mode or other operational mode, the RAM controller 125 may preserve data in the volatile memory of the microcontroller by dynamically selecting a portion of the volatile memory to be active.

In some implementations, any of the components 205, 210, 215, 220, 225 of the RAM controller 125 may be implemented in hardware or software or combinations of the two. For example, some or all of the components 205, 210, 215, 220, 225 may be implemented in software that is stored in a memory. In operation, the software may be executed by the RAM controller 125. In another example, some or all of the components 205, 210, 215, 220, 225 may be implemented in hardware, such as implemented in an integrated or in separated ASICs, implemented using discrete elements, or implemented using a field programmable gate array (FPGA).

In some implementations, the RAM controller 125 may be used in application in connection with other volatile data storage device. For example, the volatile data storage device may require power to retain stored information. In some implementations, the RAM controller 125 may select a portion of the volatile data storage device to be enabled in a particular operational mode (e.g., low or lower power mode). The RAM controller 125 can store particular data in the enabled portion in the storage device to preserve the data.

Additionally, the RAM controller 125 can disable the other portion of the volatile storage device to reduce leakage current and power consumption.

A number of implementations have been described. Nevertheless, it will be understood that various modifications may be made. For example, advantageous results may be achieved if the disclosed operations were performed in a different sequence, if components in the disclosed systems were combined in a different manner, or if the components were replaced or supplemented by other components. Some disclosed functions and processes (including algorithms) may be performed in hardware, software, or a combination thereof, and some implementations may be performed on modules or hardware not identical to those described. Accordingly, other implementations are within the scope of the following claims.

What is claimed is:

1. A smartcard comprising:
   a volatile memory including plurality of addressable areas for storing data; and
   a controller, responsive to a lower power condition for enabling power to a first portion of the addressable areas and disabling power to a second portion where the controller dynamically allocates the portions over time including dynamically selecting a location of the first portion at each occurrence of a low power condition in accordance with a random selection, a round robin selection or a selection based on a plurality of predetermined configurations, dynamically selecting a new different location for the first portion when a lower power condition persists for longer than a predetermined period of time and moving data from the location to the new different location.

2. The smartcard of claim 1 where the addressable areas comprise a plurality of memory banks.

3. The smartcard of claim 2 further comprising a detector for detecting the lower power condition.

4. The smartcard of claim 2 where the controller dynamically determines which memory banks to power, and re-locates as necessary data that is required to be maintained during the lower power condition in powered banks of the volatile memory.

5. The smartcard of claim 4 where dynamically determining includes defining different portions for power at different points in time.

6. The smartcard of claim 4 where dynamically determining is controlled in software.

7. The smartcard of claim 6 where software moves data in response to a determination of which portion is powered.

8. The smartcard of claim 4 where dynamically includes randomly determining the first and second portions.

9. The smartcard of claim 1 where the controller includes an address scrambler operable to scramble addresses so that logical address associated with the memory map to different physical addresses in the memory.

10. A method comprising:
    identifying a plurality of addressable areas for storing data in a volatile memory element of a device; and
    responsive to a detection of a power condition in the device, enabling power to a first portion of the addressable areas and disabling power to a second portion including dynamically allocating the portions over time including dynamically selecting a location of the first portion at each occurrence of a low power condition in accordance with a random selection, a round robin selection or a selection based on a plurality of predetermined configurations, dynamically selecting a new different location for the first portion when a lower power condition persists for longer than a predetermined period of time and moving data from the location to the new different location.

11. The method of claim 10 where the power condition is a low power condition and where the method further comprises detecting the low power condition.

12. The method of claim 10 where the addressable areas comprise a plurality of memory banks.

13. The method of claim 12 further comprising dynamically determining which memory banks to power, and re-locating as necessary data that is required to be maintained during the power condition in powered banks of the volatile memory.

14. The method of claim 13 where dynamically determining includes defining different portions for power of the volatile memory at different points in time.

15. The method of claim 13 where dynamically determining is controlled in software.

16. The method of claim 13 where dynamically determining includes randomly determining the first and second portions.

17. The method of claim 10 further comprising scrambling addresses so that logical address associated with the volatile memory element map to different physical addresses in the volatile memory element.

18. A circuit comprising:
    a volatile memory including plurality of addressable areas for storing data; and
    a controller, responsive to a lower power condition for enabling power to a first portion of the addressable areas and disabling power to a second portion where the controller dynamically allocates the portions over time including dynamically selecting a location of the first portion at each occurrence of a low power condition in accordance with a random selection, a round robin selection or a selection based on a plurality of predetermined configurations where the plurality of predetermined configurations are determined prior to a start of a low power condition.

19. The circuit of claim 18 where the addressable areas comprise a plurality of memory banks and a detector for detecting the lower power condition.

20. The circuit of claim 19 where the controller dynamically determines which memory banks to power, and re-locates as necessary data that is required to be maintained during the lower power condition in powered banks of the volatile memory.

21. The circuit of claim 20 where dynamically determining includes defining different portions for power at different points in time.

22. The circuit of claim 20 where dynamically includes randomly determining the first and second portions.

23. The circuit of claim 18 where the controller includes an address scrambler operable to scramble addresses so that logical address associated with the memory map to different physical addresses in the memory.

* * * * *